R.E. 25625

United States Patent Office 2,920,990
Patented Jan. 12, 1960

2,920,990

STRUCTURAL ADHESIVE COMPOSITIONS

Jerome L. Been and Martin M. Grover, Rutherford, N.J., assignors to Rubber and Asbestos Corporation, Bloomfield, N.J., a corporation of New Jersey No Drawing. Application June 2, 1954
Serial No. 434,088

15 Claims. (Cl. 154—43)

This invention relates to adhesive compositions. In particular, it relates to structural adhesives having high bond, peel and impact strength. It further relates to such adhesives which are solvent-resistant.

Structural adhesives are those which contribute to the load-bearing or stress-relieving properties of the laminate in which they are used. The physical and chemical requirements of structural adhesives are extremely high since not only must the bonds resist stresses from every direction but they must also not affect the physical properties of the material they join. In most cases, it is desirable that the strength of the bond be no less than the strength of the basic components. One example of an extensive, familiar application of a structural adhesive is in plywood fabrication.

Although much satisfactory progress has been reported for structural adhesives used for wood, structural adhesives used for metal, whether to metal or other materials, are generally regarded as being only partially satisfactory. Materials that have been previously proposed for metal-bonding have often been erratic in both application and bonding quality. Further, previously described materials have been generally lacking in one or more of the essential physical requirements for metal to metal bonds. This may be due to the fact that bonding of a porous material such as wood permits the development of adhesion by mechanical anchorage, whereas the bonding of non-porous structural components such as metals and rigid plastics involves primarily specific adhesion forces.

In accordance with this invention, a new series of materials is described which can be used to formulate structural adhesives having excellent bonding qualities to metals, extremely high bond, peel and impact strength, as well as resistance to such solvents and chemicals as aviation fuels, anti-freezes, lubricants, etc. These new materials form excellent metal-to-metal bonds, and can be used to formulate structural adhesives having sufficient strength and weathering properties to join metal skins to the metal honeycomb cores used in airplane fabrication. Further, these new materials have wide application, including use as a bonding material between copper and phenolic-resin sheets, such as are used in electrical "printed circuits," and to other rigid plastics such as molded or molded reinforced sheets based on polyester, epoxy or silicone resins.

The three basic components of the novel adhesive compositions of this invention comprise a fusible phenol-aldehyde resin, a polyepoxide resin, and a member of the group consisting of butadiene-acrylonitrile copolymer and polyvinyl-acetals having between 2 and 25 percent residual hydroxyl groups. The interreaction of these three components yields the novel product of this invention.

It should be noted that when butadiene-acrylonitrile copolymers or polyvinyl-acetal resins are heated with polyepoxide resins alone that no appreciable co-reaction takes place. When the three components are heated together, however, the components do co-react and the resultant products have an unexpectedly high bond, impact and peel strength as adhesives for a wide variety of structural materials. Further, in many cases these novel products are amenable to low-temperature curing.

The term "polyepoxide resin" as used herein describes the polymeric reaction products of polyfunctional halohydrins such as epihalo-hydrins with polyfunctional hydrogen-donating reactants, or their salts, such as polyfunctional phenols, alcohols, amines, acids and their salts. The major reaction is presumably a splitting out of hydrogen or metal halide with simultaneous opening and reaction of the epoxy ring. The resin molecule would then contain functional hydroxy side groups, 1,2 epoxy end groups, and ethereal or ester linkages. A small proportion of hydroxy end groups are also likely to be present. Other terms often used synonymously with "polyepoxide resin" are "polymeric glycidyl-ethers" and "epoxy-hydroxy polyether resins." The term "polyepoxide resin" as used herein is also intended to include glycidyl polyesters as well as glycidyl polyethers. The important common properties are the resinous character and functional 1,2 epoxy and hydroxy groups. Polyepoxide resins are also preparable from epoxy-containing compounds having a non-halide, hydrogen bonding reactive group.

A typical method of preparing a polyepoxide resin is described in United States Patent No. 2,500,449 in which epichlorohydrin is reacted with bisphenol at 100° C. in the presence of sufficient alkali to bind the hydrochloric acid formed. The resins formed vary according to the molal proportions and reaction conditions, and have melting points ranging from about 40° to 110° C. In this particular case the end groups are presumed to be epoxy groups while there are many intermediate functional hydroxy groups. Further hardening of a typical polyepoxide resin such as this is usually provided by heating with a hardening agent, customarily bifunctional, which acts to cross-link the previously formed resin. Such hardening agents include oxalic acid, citric acid, inorganic bases, organic bases, etc. Other polyepoxide resins and methods for their preparation are described in United States Patents 2,444,333; 2,528,932, 2,500,600; 2,467,171, and others.

Polyepoxide resins are available commercially in a wide range of epoxy content, molecular weight, softening point and compositions. Common known sources of such commercial resins include Shell Chemical Co. ("Epon" resins) and Ciba, Ltd. ("Araldite" resins).

The butadiene-acrylonitrile copolymers useful in this invention are those whose acrylonitrile content is in the range of 15 to 45 percent, and include both the common high molecular weight elastomeric copolymers and the low molecular weight oily copolymers. Such copolymers are preparable in emulsion at slightly elevated temperatures and in the presence of an oxygen-yielding catalyst, such as hydrogen peroxide, benzoyl peroxide, potassium persulfate or other alkali metal persulfates or perborates or mixtures thereof. When the monomers are converted to 70 percent or over in the presence of small amounts of modifiers, such as 0.5 to 2 percent of alkyl mercaptans containing 6 to 16 carbon atoms, the coagulated products are elastomeric solids. However, by using larger amounts of such modifiers (i.e. 3 to 12 percent) the products upon coagulation, are normally liquid non-rubbery, low molecular weight, co-polymers resembling a viscous oil. Of interest among the viscous oily copolymers are those whose viscosity is less than two million centipoises as measured by a Brookfield viscometer at 25° C. The elastomeric form of these copolymers are available under the trademarks of Hycar OR (B. F. Goodrich Chemical Co.), Chemigum (Goodyear Tire and Rubber Co.), Paracril (U.S. Rubber Co.), and Butaprene (Xylos Rubber Co.).

The polyvinyl acetals useful in this invention can be prepared by hydrolyzing polyvinyl acetate and then condensing the resultant alcoholic groups with aldehydes so that the final product has a residual hydroxyl content of between 2 and 25 percent. Aldehydes which can be thus condensed include acetaldehyde, formaldehyde, butyraldehyde and mixtures and polymers thereof. With polyvinyl acetals having lower than 2 percent residual alcoholic group content, there is negligible reactivity with the polyepoxide and phenolic resin components of this invention.

The phenol-aldehyde resins which can be used in this invention include practically any fusible, thermo-setting phenolaldehyde resin. The phenol components, for example, can be phenol, cresol, xylenol, napthol, resorcinol, cardanol, cashew nut shell oil, other substituted phenols and mixtures thereof. The aldehyde component can be any aldehyde reactive with the phenol, including formaldehyde, acetaldehyde, furfural or polymers, addition products and mixtures thereof. These resins are usually prepared by condensation of phenol with an aldehyde, the reactions being stopped at such a point that the resin is still fusible and soluble in polar solvents. In addition, the resin may be either a straight phenol aldehyde resin or such a resin as modified according to known practices.

The relative proportions of the various components of this invention may be varied according to the intended end use. The copolymer or polyvinyl acetal content may be major where flexibility, peel and impact strength requirements dominate. The epoxy and phenolic components impart rigidity, high temperature strength, chemical resistance and specific adhesion to non-porous surfaces. For many applications, substantially equal proportions of the three components are useful. Within a very wide range of proportions, high bond, peel and impact strength will be attained.

We have found that the high molecular weight polyepoxide resin is more reactive with the low molecular weight phenolic resins, presumably because of the higher content of terminal methylol groups as contrasted with longer chain phenolics. On the other hand, low molecular weight polyepoxides are more reactive with the phenolic hydroxyl group rather than terminal methylol group. Each polyepoxide can be used with each phenolic in this invention, so that the molecular weights of the components of this invention are not limiting factors. In general, however, film flexibility is enhanced by high molecular weight polyepoxide resins, whereas rigidity is enhanced by low-molecular weight polyepoxide resins.

The products of this invention may be used in different ways. These materials may be used as adhesive films, casting compounds, or molding compounds, or applied to objects from solution. By suitable choice of components, as for example, the liquid copolymer, fluid compositions can be obtained without the use of solvents.

In preparing compositions for particular uses the products of this invention may be mixed with inert fillers or reinforcing fillers as well as common plasticizers and milling aids without detracting from their wide range of specific adhesion and high bonding strength. Inert fillers include such materials as talc, silica, ignited aluminum oxide, zinc dust, and aluminum powder. Reinforcing fillers include various of the carbon blacks. An example of a plasticizer is a high boiling ester such as dibutyl phthalate. Fillers are normally insoluble and are milled in by the mechanical action of a rubber mill, internal mixer and the like.

Where compounding ingredients are used, these may be mixed with the reactive components of this invention before reaction, or may be added to the inter-reacted product. The end-properties in either case are quite similar.

Cross-linking agents are not needed to obtain useful products. However, reactive cross-linking agents may be added of the sort normally used for the vulcanization or curing of the individual initial components of these compositions. Thus polyepoxide hardening agents such as dicyandiamide may be added in small quantity to provide internal cross-linking of the reactive polyepoxide residues in the inter-reacted products of this invention. Further, where these compositions include butadiene-acrylonitrile copolymers, cross-linking agents of the ordinary rubber variety may be added to promote the internal cross-linking of the reactive copolymer residues in the inter-reacted products of this invention. Such cross-linking agents include curing and vulcanizing systems, e.g. a mixture of zinc oxide, sulfur and mercaptobenzothiazole, the latter material being commonly referred to as a rubber accelerator. Other rubber accelerators such as butyraldehyde-aniline and thiuram-disulfide may be used.

The term "cross-linking agent" as used herein and in the appended claims is intended to indicate the presence of either Polyepoxide harding agent alone,
Rubber vulcanizing systems for butadiene acrylonitrile copolymers, or
Both polyepoxide hardening agents and rubber vulcanizing systems.

It is understood, of course, that polyvinyl acetals would not be affected by cross-linking agents of the above types. The term "inter-reaction product" as used in the appended claims is intended to include those made with such cross-linking agents as described above as well as those made without such cross-linking agents.

Within the scope of this invention, a broad range of reactive components can be used, each having a wide variety of fluidities, melting points and compositions. It is obvious that a person skilled in the art could readily formulate compositions having the desired application characteristics. However, this invention may be better understood if some detailed examples are given, even through they are by no means intended to limit the scope of this invention.

In all the examples and discussions below all percentages are on a percentage weight basis and all parts are on a parts by weight basis.

In the following examples, the various components used were obtained or prepared as follows:

*Butadiene-acrylonitrile copolymer A.*—A rubbery copolymer was prepared by reacting at 30–40° C. an agitated emulsion of approximately 70 parts butadiene, 30 parts acrylonitrile, 0.35 parts hydrogen peroxide and 250 parts of emulsifying solution containing 2 percent fatty acid almost completely neutralized with alkali. After salt-acid coagulation the copolymer crumbs were filtered, washed and dried.

*Hycar OR–25 (butadiene-acrylonitrile copolymer).*—A commercial butadiene-acrylonitrile copolymer made by the B. F. Goodrich Chemical Co., and indicating upon Kjehldahl ammonolysis an acrylonitrile content of roughly 30 percent.

*Hycar OR–15 (butadiene-acrylonitrile copolymer).*—A commercial butadiene-acrylonitrile copolymer made by the B. F. Goodrich Chemical Co., and indicating upon Kjehldahl ammonolysis an acrylonitrile content of roughly 40 percent.

*Chemigum N4–NS30 (butadiene-acrylonitrile copolymer).*—A commercial butadiene-acrylonitrile copolymer made by the Goodyear Tire and Rubber Co., and indicating upon Kjehldahl ammonolysis an acrylonitrile content of roughly 30 percent.

*Paracril AJ (butadiene-acrylonitrile copolymer).*—A commercial butadiene-acrylonitrile copolymer made by the Naugatuck Division of U.S. Rubber Co., and indicating upon Kjehldahl ammonolysis an acrylonitrile content of roughly 18 percent.

The commercial copolymers described above were evaluated in the formulas given below, and were found practically equivalent to the cited laboratory copolymers of corresponding acrylonitrile content. In addition "Copolymer A" was made with a content of 15 percent acrylonitrile, to yield a product designated as "Copolymer A–1." Also, "Copolymer A" was made with a content of 45 percent acrylonitrile, to give a product designated as "Copolymer A–2."

*Liquid copolymer A–3.*—This was prepared by reacting 70 parts of butadiene, 30 parts of acrylonitrile, 40 parts of sodium oleate, 6 parts of lauryl mercaptan, 0.3 potassium persulfate, 200 parts water. The above ingredients were mixed together and allowed to react at a temperature of 30° C. for 15 hours with constant agitation. The resultant latex was then stabilized by the addition of one part of ditertiary butylparacresol and after stabilization, the latex was coagulated with brine to give an oily viscous liquid which was washed with alcohol and water and dried at 125° C. The viscosity was 175,000 centipoises at 25° C. as measured with a Brookfield viscometer, spindle 2, at 10 r.p.m., and the average molecular weight was in the range of 3,000 to 6,000.

*Bakelite resins XYHL and XYSG (polyvinylacetals).*—These resins are polyvinylbutyrals made by the Bakelite Division of Carbide and Carbon Chemicals Co. According to technical releases of the manufacturer, these are prepared by hydrolysis of polyvinylacetate to polyvinylalcohol, followed by condensation of the alcoholic groups with butyraldehyde. "Bakelite Technical Release No. 11" states that XYHL has an intrinsic viscosity of 0.81, a vinyl content of 54.4%, butyraldehyde content of 38.3%, a residual hydroxyl content of 7.0% (19% expressed as polyvinylalcohol content) and a residual acetate content of 0.3%. Resin XYSG has a reported intrinsic viscosity of 1.16 and similar chemical composition. In appearance, resin XYSG is more viscous in solution than XYHL. Both are obtained as powdered resins.

*Resin "Formvar 15–95" (polyvinylacetal).*—This is a polyvinyl formal made by the Shawinigan Products Corp., New York city. According to their "Formvar" Technical Release of July 1949, this resin has a polyvinyl alcohol content of 5–6%, a residual polyvinyl acetate content 9–13%, and a hardness by the Rockwell "M" method of 80–90.

*Polyepoxide resins B, C, and D.*—A heated mixture of bis-phenol (bis-(4-hydroxyphenyl)-2,2-propane) with a molal excess of epichlorohydrin is kept stirred with 10% aqueous sodium hydroxide of between 1.1 and 1.3 mols per per mol of bisphenol. After refluxing for a sufficient time at about 100° C. the reaction is stopped and the resin removed and purified.

With an epichlorohydrin content of 2.5 mols per mol of bisphenol, the resultant resin is resin B, having a softening point of about 5° C.

With 2.0 mols per mol of bisphenol, the resultant resin is resin C, having a softening point of about 25° C.

With 1.25 mols per mol, the resultant resin is resin D, having a softening point of about 100° C.

In the formulae listed below, various commercial polyepoxide resins were substituted and found to be equivalent as indicated.

By comparison of softening points, and by pyridinium chloride analysis of the 1.2 epoxy content, it was determined that Shell Chemical Co.-Epon 828 was equivalent to resin B; while Epon 834 essentially corresponded with resin C and Epon 1004 and Ciba Ltd.'s Araldite CN–501 were substantially equivalent to polyepoxide resin D. Substitution of these commercial materials and curing gave similar end physical properties.

*Polyepoxide resin E.*—A bis-phenol "H" was prepared by reacting cardanol (from heat-treated cashew nut shell liquid, in which the anacardic acid is substantially decarboxylated), with an equi-molar quantity of phenol, in the presence of a Friedel-Crafts catalyst. One mol of bis-phenol "H" was reacted under alkaline conditions, as in the previous example, with two mols of epichlorohydrin. The resultant resin is resin E, having a softening point of about 20° C.

*Polyepoxide hardening agent.*—The hardening or cross-linking of polyepoxide resins is ordinarily effected by heating with compounds reactive with the hydroxy or epoxy groups. Among the useful hardening agents are: melamine as 20/100 of resin, dicyandiamide—20/100 diallyl melamine—10/100, and diethylene-triamine—6/100 and also various amounts of dicarboxylic acids such as maleic acid and phthalic acid.

*Phenolic resin F.*—Eight mols of phenol were heated with 10 mols of formaldehyde in the presence of 0.12 mol of sodium hydroxide for a period of three hours at 95° C. After the reaction was completed, the resin was treated by boiling off the water at reduced pressure.

*Phenolic resin G.*—Seven mols of phenol and 4 mols of cardanol were reacted with 14 mols of formaldehyde in the presence of 0.19 mol of sodium hydroxide for a period of 3 hours at 95° C. After the reaction was complete, the resin was dried by boiling off the water at reduced pressure.

*Phenolic resin H.*—Five mols of cresol were heated with 10 mols of formaldehyde in the presence of 0.14 mol of sodium hydroxide for a period of 2 hours at 96° C. After the reaction was completed the resin was dried by boiling off the water at reduced pressure.

The novel compositions of this invention can be prepared by heating of the three components alone followed by addition of the compounding ingredients. However, we have found that similar products can be obtained by making the three components in the presence of the compounding ingredients.

Example 1

One hundred parts of Chemigum N4NS30 were broken down on a rubber mill and then blended with 50 parts each of polyepoxide resin C and phenolic resin F in a Baker-Perkins internal mixer. The resultant heavy mass was sheeted into a film .010 inch thick on a 3-roll calender. When this film was heated between two sheets of aluminum at 300° F. for 45 minutes under 200 p.s.i. pressure, a strong bond resulted. The tensile shear strength was 2,500 p.s.i. and the peel strength of the bond 27 lbs./in. width.

Example 2

The following stock was prepared on a rubber mill:

| | Parts |
|---|---|
| Chemigum N4NS30 | 100 |
| Sulfur | 5 |
| Mercaptobenzothiazole | 2 |
| Zinc oxide | 5 |
| Stearic acid | 1 |

This stock was charged to a Baker-Perkins internal mixer together with:

| | Parts |
|---|---|
| Polyepoxide resin C | 50 |
| Phenolic resin F | 50 |
| Dicyandiamide | 10 |

The resultant heavy mass was sheeted into a film 0.010 inch thick on a 3-roll calender. When this film was heated between two sheets of aluminum at 300° F. for 45 minutes under 200 p.s.i. pressure, a strong bond resulted. The tensile shear strength was 3,500 p.s.i. and the peel strength of the bond 18 lbs/in. width. Example 1 is distinguishable from Example 2 in that Example 2 contains a system capable of further internal cross linking of the copolymer and a system capable of further internal cross linking of the polyepoxide resin. The products of Examples 1 and 2 are soluble in ketones and acetates and may be alternately dispersed in a reactive diluent, such as a very low molecular weight or monomeric epoxide (e.g. allyl glycidyl ether), as in the following examples:

|  | Example 2A Parts | Example 2B Parts |
|---|---|---|
| Hycar OR 25 (Previously milled) | 100 | 100 |
| Polyepoxide Resin B | 100 | 100 |
| Phenolic Resin G | 100 | 100 |
| Sulfur | 5 | 5 |
| Mercaptobenzothiazole | 2 | 2 |
| Zinc oxide | 5 | 5 |
| Stearic Acid | 1 | 1 |
| Dicyandiamide | 20 | 40 |
| Aluminum powder | 50 | 50 |
| Methyl ethyl ketone | 100 | — |
| Allyl glycidyl ether | — | 100 |

The above ingredients were blendled in a Baker-Perkins internal mixer and found to be heavy, stringy doughs which could be spread with a trowel or spatula. When applied as a smoothing compound to a rough steel casting, and given a pre-bake at 160° F. for 1 hour, Example 2A was found to have shrunken due to evaporation of the ketone solvent. After cure in an oven at 300° F. for 1 hour, both compounds adhered toughly and tenaciously to the metal; however, Example 2B was slightly more brittle than Example 2A.

*Example 3*

The following formulation was found to give a flexible protective coating for metals, with tenacious adhesion, when applied, dried, and then cured at 325° F. for 30 minutes. Formula:

| | Parts |
|---|---|
| Paracril AJ | 100 |
| Phenolic resin H | 200 |
| Polyepoxide resin D | 200 |
| Methyl-ethyl-ketone | 300 |
| Cyclohexanone | 100 |
| Zinc dust | 250 |

The ingredients of Examples 3 and 4 were blended in a Struthers-Wells rubber cement mixer.

*Example 4*

The following formulation was applied to electrolytic sheet copper and dried for 1 hour at 140 F.

| | Parts |
|---|---|
| Chemigum N4NS30 | 100 |
| Varcum 2896 B (a low molecular weight fusible phenolaldehyde resin) | 200 |
| Polyepoxide resin D | 300 |
| Methyl-ethyl-ketone | 500 |

The coated copper was bonded in a hydraulic press to a silicone resin base rigid laminate, glass reinforced, electrical grade. Curing conditions were 325° F. glue line temperature for 40 minutes at 250 p.s.i. The peel strength (NEMA—National Electric Manufacturers Association) method was 14 lbs./in. and the resulting copper-clad laminate did not blister during a test consisting of floating on molten solder at 450° F. for 10 seconds.

*Example 5*

100 parts of copolymer A were blended with 50 parts each of polyepoxide resin C and phenolic resin E in a Baker-Perkins internal mixer. When a film of the material was heated between two sheets of aluminum at 300° F. for 25 minutes under 200 p.s.i. pressure, an assembly was formed having 2,400 p.s.i. tensile shear strength, excellent peel and impact strength.

*Example 6*

The following ingredients were blended in an internal mixer:

| | Parts |
|---|---|
| Copolymer A1 | 100 |
| Polyepoxide resin B | 100 |
| Phenolic resin G | 100 |
| Sulfur | 5 |
| Mercapto-benzothiazole | 2 |
| Zinc oxide | 5 |
| Stearic acid | 1 |
| Dicyandiamide | 20 |
| Ignited aluminum oxide | 300 |
| Allyl glycidyl ether | 20 |

When this material is formed into a film mechanically (by calendering), such a film when heated at 300° to 30 minutes under light contact pressure will form a bond between two pieces of aluminum or aluminum and molded phenolic plastic or glass and steel. These bonds have been found to be over 4000 p.s.i. tensile shear with metals and in excess of the strength of glass or phenolic laminates. Test of 24ST3 Alclad aluminum to aluminum bonds by the methods of U.S. Air Force Spec. MIL-A-8331 gives a bond strength of 240 lbs. The peel strength is 24 lbs./inch.

*Example 7*

This is a formulation which has special value for adhering rigid materials, such as, plastics, wood, metal or glass to one another. An assembly made with this adhesive and then heated for 30 minutes at 300° F. under light contact pressure exhibits high strength characteristics and good high temperature resistance. It is especially unique as regards its high peel and bond strengths. Its characteristic results from the internal plasticization contributed by the co-vulcanizing elastomer. The formulation is as follows:

| | Parts |
|---|---|
| Hycar OR-15 | 100 |
| Aluminum powder | 100 |
| Sulfur | 12 |
| Butyraldehyde-aniline | 2 |
| Phenolic resin F | 100 |
| Polyepoxide B | 100 |
| Methyl-ethyl-ketone | 400 |

To demonstrate this internal structure for the compositions of this invention, let us contrast the properties of Example 7 with the following:

| | Example 7A | Example 7B |
|---|---|---|
| Hycar OR-15 | 100 | — |
| Aluminum powder | 100 | 100 |
| Sulfur | 12 | — |
| Butyraldehyde-aniline | 2 | — |
| Phenolic resin F | 100 | 100 |
| Polyepoxide resin B | — | 100 |
| Methyl-ethyl-ketone | 400 | 400 |

The following bend strength, and 180° F. tensile shear strengths were measured as described in Spec. MIL-A-8331 (USAF) and were on 0.064 in. thick 24ST3 Alclad aluminum. The peel strength was measured on two strips of .006 inch thick aluminum foil, bonded to each other, pulled at 2 inch/minute at an angle of 180° F. on a Scott tester. The following results were obtained:

| Example | Tensile shear 180° F. | Lbs. bend | Lbs./inch peel |
|---|---|---|---|
| 7 | 3000 | 205 | 17 |
| 7A | 1000 | 160 | 12 |
| 7B | 2800 | 120 | 0.5 |

*Example 8*

The following formulation was prepared by blending the dry ingredients in an internal mixer and then adding the solvent:

| | Parts |
|---|---|
| Copolymer A2 | 100 |
| Aluminum powder | 100 |
| Sulfur | 12 |
| Butyraldehydeamine | 2 |
| Phenolic resin F | 100 |
| Polyepoxide resin B | 100 |
| Methyl-ethyl-ketone | 400 |

By applying this formulation to the desired surfaces, drying and then heating for 30 minutes at 300° F., rigid assemblies of wood to aluminum, aluminum to glass, molded phenolic to glass, and aluminum to aluminum can be prepared. All the assemblies thus prepared had extremely high bond strengths and peel strengths and further showed excellent high temperature resistance. For example, bonds to wood delaminated the wood; to glass pulled pieces out of the glass; to phenolics, delaminated the phenolic.

*Example 9*

This example is a solventless paste capable of bonding well to metals and plastics and is particularly suitable to filling, casting, molding, potting and embedding applications. A formulation is as follows:

| | Parts |
|---|---|
| Liquid copolymer A3 | 100 |
| Phenolic resin F or G | 200 |
| Polyepoxide resin C | 400 |
| Aluminum powder | 250 |
| Dicyandiamide | 20 |
| Sulfur | 15 |
| Zinc oxide | 2 |
| Accelerator 833 | 2 |

Reaction is carried out by heating, after application, at 300° F. for 60 minutes. Practically no shrinkage takes place during cure.

*Example 10*

A particular satisfactory adhesive for use in making copper-clad laminates for electrical printed circuits was prepared with the use of a polyvinyl acetal resin, as follows:

| | Parts |
|---|---|
| Bakelite resin XYHL or XYSG (polyvinyl acetal) | 100 |
| Phenol aldehyde resin F or G | 150 |
| Polyepoxide resin D | 100 |
| Aluminum powder | 200 |
| Isopropyl acetate | 200 |
| 95% isopropyl alcohol | 100 |

Reaction was carried out by drying and then heating at 300° F. for 30 minutes. These laminates consist of copper or aluminum foil bonded to phenolic resin, polyester resin or epoxy resin saturated rigid fiberglass reinforced baseboards. The specifications of the NEMA require them to have excellent electrical properties, heat resistance, high peel strength, and resistance to immersion in molten solder.

*Example 11*

Another paste formulation which has extremely high strength in adhesion is prepared by mixing in a Baker Perkins double arm mixer the following ingredients in their order:

| | |
|---|---|
| Copolymer A-1 | 400 |
| Copolymer A-1 | 400 |
| Aluminum | 400 |
| Dicyandiamide | 50 |
| Sulfur | 15 |
| Zinc oxide | 5 |
| Phenolaldehyde resin H | 200 |
| Polyepoxide resin E | 100 |
| Allyl glycidyl ether | 50 |

The resultant material is a heavy but trowelable paste which contains no solvent since the ether is reactive during the curing cycle. Such a material cures essentially without shrinkage and is suitable for side sealing and repairs of airframe structural honeycomb laminates.

*Example 12*

A base resin solution was prepared by stirring together 100 parts of epoxy resin D, 100 parts of phenolic resin H, and 200 parts of methyl ethyl ketone. This solution was brushed onto each of two sheets of aluminum and Formvar 15/95 resin powder was sprinkled onto the wet adhesive surface, and the excess shaken off. After drying 10 minutes at 160° F. to remove the remaining ketone solvent, the coated surfaces were bonded together in a press at 320° F. for one hour under 250 p.s.i. pressure. The resultant bond was 3600 p.s.i. in tensile shear, 170 lbs. bend, and 12 lbs./inch peel. The advantage of this type of adhesive film thickness is that it permits the filling of voids between metal sheets which are not entirely flat.

In addition to their direct use as adhesives in fluid form the compounds of this invention may be used for preparing adhesive films, either by calendering of solvent-free doughs, or by casting a film from a solvent solution. If for example a solvent cement such as Example 8 is spread in a conventional way onto an anti-adhesive carrier web (such as a baked-silicone-resin coated paper) and then dried at 150° F. for 30 minutes or equivalent, the cast film will be an excellent latent adhesive which can be rolled up and carefully stored at 50° F. for long periods of time. When freed from the backing it has sufficient cohesiveness although uncured to be easily handled and cut into the desired size and shape for assembly between the parts to be bonded. Typical bonding conditions are 300° F. for 40 minutes under 100 p.s.i. pressure.

One example of the practical use of such an adhesive film is in the assembly of metal skins to "honeycomb" (foamed plastic, expanded metal or plastic impregnated paper or wood) cores to produce light-weight structural laminates used in airframe manufacture. The excellent flow characteristics and heavy film thickness of the adhesive film provides thorough contact between the adhesive and the surface to be joined.

Another application which demonstrates the superiority of the compositions of this specification is in the preparation of copper clad laminates for printed circuits. The present standards for laminates of this type are issued by the National Electrical Manufacturers Association, New York, New York, and the current issue is of November 12, 1953. This laminate consists of a sheet of copper foil bonded by an adhesive to the surface of a paper base phenolic resin saturated laminate of specified electrical properties. So called printed circuits are formed by subsequent etching of the surface of the copper bonded to the phenolic into a predetermined wiring pattern. The circuit components are then soldered to the copper. Properties which are specified and are important are the strength of the bond, the peel resistance, the temperature resistance, and the matching of dielectric strengths with the base of the laminate and the adhesive. Whereas NEMA specified a minimum of 3 to 4 lbs./inch peel, Examples 7 and 10 give over 25 lbs./inch peel. Whereas NEMA requires 10 seconds solder resistance at 200° C., our examples would stand 235° C. molten solder. Whereas NEMA specifies that no blistering shall occur when the laminate is subjected to an oven test of 120° C. for 30 minutes, laminates made with our examples will withstand this oven test for one week without blistering. The NEMA specification is based on the use of so-called XXXP phenolic baseboards because of poor experience in bonding copper to other resin baseboards which have better dielectric properties such as epoxy, polyester, and silicone. With the examples of our invention excellent bond can be obtained to these superior baseboards.

It has been proposed in the past that phenolic resins might be reactive separately with various other stated components of this invention, namely the copolymers or the epoxy resins. However, the physical properties, particularly as pertain to bonding and to degree of cross linking are unexpectedly far superior when the three components are co-reacted than when any two components are reacted. Further, by adjustment of molecular weight of the components, various types of products can be formed.

The reaction products of this invention should be carefully distinguished from simple heated mixtures of copolymers and polyepoxide resins. Mixtures of these two components, we have found, do not react when heated since the original components can be almost completely recovered by solvent extraction. Mixtures of the three components of this invention react when heated, and it was not possible to isolate any of the original components. Further, if the copolymer and the polyepoxide resin were compounded with appropriate curing and hardening ingredients and then separately cured, the resultant products show no substantial reactivity when mixed and can be separated out even after heating. On the other hand, when the phenolic resin is added to the two other components, even in the absence of any other curing or hardening agents, the resultant resin has different physical properties than any of the original components, has much reduced solubility and is not separable into original components.

The products of this invention are distinguishable from other adhesives presumably because of the formation of gigantic cross-linked molecules containing internal elastomeric groups, which allow high bond strength together with high flexibility where desired.

Although there is insufficient evidence to do other than speculate on the mechanism of the reaction of this invention, it is believed that there are at least three possible co-reactions. In one reaction the copolymer or polyvinyl acetal resin reacts with the methyl and phenol hydroxy groups of the phenolic resins. The second possible reaction is condensation between the methylolhydroxy groups of the phenolic resin and the chain hydroxy groups of the epoxide resin, with the expulsion of water. A third possible reaction is addition between the epoxy end group of the epoxide resin and the phenolic hydroxyl group of the phenolic resin. It is not certain that these are the only or principal co-reactions, but it is believed that the reaction product of this invention is a single compound of large and complex structure wherein the phenolic resin serves as the primary link between the epoxide resin and either the copolymer or polyvinyl acetal.

We claim:

1. An adhesive composition containing as a major ingredient a potentially inter-reactive mixture comprising a polyepoxide resin having reactive epoxy and hydroxyl groups, a fusible, thermosetting phenolaldehyde resin, and a member of the group consisting of polyvinyl acetals having 2 to 25 percent residual hydroxyl content and butadiene-acrylonitrile copolymers containing 15 to 45 percent acylonitrile.

2. An adhesive composition containing as a major ingredient a potentially inter-reactive mixture comprising polyepoxide resin having reactive epoxy and hydroxyl groups, a fusible, thermosetting aldehyde resin, a liquid monomeric glycidyl ether, and a member of the group consisting of polyvinyl acetals having 2 to 25 percent residual hydroxyl content and butadiene-acrylonitrile copolymers containing 15 to 45 percent acrylonitrile.

3. A solvent dispersed adhesive composition containing as a major ingredient a potentially inter-reactive mixture comprising a polyepoxide resin having reactive epoxy and hydroxyl groups, a fusible, thermo-setting phenolaldehyde resin, and a member of the group consisting of polyvinyl acetals having 2 to 25 percent residual hydroxyl content and butadiene-acrylonitrile copolymers containing 15 to 45 percent acrylonitrile.

4. A solventless paste adhesive comprising a potentially interreactive mixture of a polyepoxide resin having reactive epoxy and hydroxyl groups, a fusible thermo-setting phenolaldehyde resin, and a normally liquid butadiene-acrylonitrile copolymer containing 15 to 45 percent acrylonitrile.

5. In a laminate, a bonding layer containing as a major ingredient the heat-hardened, inter-reacted product of a mixture of polyepoxide resin having reactive epoxy and hydroxyl groups, a fusible, thermo-setting phenolaldehyde resin, and a member of the group consisting of polyvinyl acetals having 2 to 25 percent residual hydroxyl content and butadiene acrylonitrile copolymers containing 15 to 45 percent acrylonitrile.

6. A laminate comprising a layer of metal bonded to an electrically insulating material with a bonding layer containing as a major ingredient the heat-hardened interreacted product of a mixture of polyepoxide resin having epoxy and hydroxyl groups, a fusible, thermo-setting phenolaldehyde resin, and member of the group consisting of polyvinyl acetals having 2 to 25 percent residual hydroxyl content and butadiene acrylonitrile copolymers containing 15 to 45 percent acrylonitrile.

7. An adhesive composition containing as a major ingredient a potentially inter-reactive mixture comprising a polyepoxide resin having reactive epoxy and hydroxyl groups, a fusible thermo-setting phenol-aldehyde resin, and a butadiene-acrylonitrile copolymer containing 15 to 45 percent acrylonitrile.

8. A solvent-dispersed adhesive composition containing as a major ingredient a potentially inter-reactive mixture comprising a polyepoxide resin having reactive epoxy and hydroxyl groups, a fusible thermo-setting phenol aldehyde resin and a butadiene acrylonitrile copolymer containing 15 to 45 percent acrylonitrile.

9. In a laminate, a bonding layer containing as a major ingredient the heat-hardened inter-reacted product of a mixture of polyepoxide resin having reactive epoxy and hydroxyl groups, a fusible thermo-setting phenolaldehyde resin, and a butadiene-acrylonitrile copolymer containing 15 to 45 percent acrylonitrile.

10. A laminate comprising a layer of metal bonded to an electrically insulating material with a bonding layer containing as a major ingredient the heat-hardened inter-reacted product of a mixture of polyepoxide resin having epoxy and hydroxyl groups, a fusible thermo-setting phenol aldehyde resin and a butadiene-acrylonitrile copolymer containing 15 to 45 percent acrylonitrile.

11. An adhesive composition containing as a major ingredient a potentially interreactive mixture comprising a polyepoxide resin having reactive epoxy and hydroxyl groups, a fusible thermosetting phenol-aldehyde resin, and a polyvinyl acetal having 2–25% residual hydroxyl content.

12. An adhesive composition containing as a major ingredient a potentially interreactive mixture comprising polyepoxide resin having reactive epoxy and hydroxyl groups, a fusible thermosetting resin prepared by the acid condensation of an aldehyde with a phenolic mixture containing cardanol, and a member of the group consisting of polyvinyl acetal having 2–25% residual hydroxyl content and butadiene-acrylonitrile copolymers containing 15–45% of acrylonitrile.

13. In a laminate, a bonding layer containing as a major ingredient the heat-hardened, interreacted product of a mixture of a polyepoxide resin having reactive epoxy and hydroxyl groups, a fusible thermosetting phenol-aldehyde resin and a polyvinyl acetal having 2–25% residual hydroxyl content.

14. A laminate comprising a layer of metal bonded to an electrically insulating material with a bonding layer containing as a major ingredient the heat-hardened interreacted product of a mixture of a polyepoxide resin having epoxy and hydroxyl groups, a fusible thermo-setting phenol-aldehyde resin and a polyvinyl acetal having 2–25% residual hydroxyl content.

15. A solvent-dispersed adhesive composition containing as a major ingredient a potentially interreactive mixture comprising a polyepoxide resin having reactive epoxy and hydroxyl groups, a fusible thermosetting phenol-aldehyde resin and a polyvinyl acetal having 2–25% residual hydroxyl content.

References Cited in the file of this patent

UNITED STATES PATENTS

| | | |
|---|---|---|
| 2,376,854 | Saunders | May 22, 1945 |
| 2,459,739 | Groten et al. | Jan. 18, 1949 |
| 2,506,486 | Bender et al. | May 2, 1950 |
| 2,521,911 | Greenlee | Sept. 12, 1950 |
| 2,575,265 | Fiedler et al. | Nov. 13, 1951 |
| 2,626,223 | Sattler et al. | Jan. 20, 1953 |
| 2,659,708 | Berger et al. | Nov. 17, 1953 |
| 2,684,350 | Williams | July 20, 1954 |
| 2,684,351 | Williams | July 20, 1954 |

OTHER REFERENCES

"Alloying with Epoxies," by J. Charlton, September 1954, "Modern Plastics," pages 155–157, 160, 161, 240–242.